United States Patent
Frankfurth

(10) Patent No.: US 11,277,723 B2
(45) Date of Patent: Mar. 15, 2022

(54) STABILIZATION GRID FOR SENSORS MOUNTED ON INFRASTRUCTURE

(71) Applicant: Continental Automotive Systems Inc., Auburn Hills, MI (US)

(72) Inventor: Joshua David Frankfurth, San Jose, CA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 379 days.

(21) Appl. No.: 16/394,044

(22) Filed: Apr. 25, 2019

(65) Prior Publication Data

US 2020/0213827 A1    Jul. 2, 2020

Related U.S. Application Data

(60) Provisional application No. 62/785,321, filed on Dec. 27, 2018.

(51) Int. Cl.
| | |
|---|---|
| *H04W 4/46* | (2018.01) |
| *G08G 1/16* | (2006.01) |
| *H04W 4/44* | (2018.01) |

(52) U.S. Cl.
CPC .............. *H04W 4/46* (2018.02); *G08G 1/161* (2013.01); *H04W 4/44* (2018.02); *B60W 2556/65* (2020.02)

(58) Field of Classification Search
CPC .......... H04W 4/46; H04W 4/44; G08G 1/161; B60W 2556/65
See application file for complete search history.

(56) References Cited

U.S. PATENT DOCUMENTS

| | | | |
|---|---|---|---|
| 5,847,755 A | 12/1998 | Wixson et al. | |
| 6,044,166 A | 3/2000 | Bassman et al. | |
| 10,134,278 B1* | 11/2018 | Konrardy | G08G 1/096791 |
| 2006/0092280 A1 | 5/2006 | Kamijo et al. | |
| 2010/0141761 A1* | 6/2010 | McCormack | H04N 5/23248 348/143 |
| 2015/0127189 A1 | 5/2015 | Mehr et al. | |
| 2020/0008028 A1* | 1/2020 | Yang | H04W 4/48 |
| 2020/0053286 A1* | 2/2020 | Corona | H04N 5/23267 |
| 2020/0124765 A1* | 4/2020 | Nishimura | H04R 1/028 |

FOREIGN PATENT DOCUMENTS

| | | |
|---|---|---|
| JP | 2011237931 A | 11/2011 |
| WO | 2015055737 A1 | 4/2015 |

OTHER PUBLICATIONS

International Search Report and the Written Opinion of the International Searching Authority dated Apr. 24, 2020 for the counterpart PCT Application No. PCT/2019/065557.

* cited by examiner

*Primary Examiner* — Ramsey Refai

(57) ABSTRACT

A method and apparatus includes at least one environmental sensor mounted to an infrastructure component that is capable of moving relative to ground. The at least one environmental sensor determines an object position. A system uses environmental data collected over time to learn a fixed environment that includes at least one learned reference point. The system determines an amount of movement of the infrastructure component in relation to the learned reference point. The system corrects object position to compensate for movement of the infrastructure component.

9 Claims, 2 Drawing Sheets

STABILIZATION GRID FOR SENSORS MOUNTED ON INFRASTRUCTURE

PRIORITY CLAIM

This application claims the benefit of U.S. Provisional Application No. 62/785,321 filed on Dec. 27, 2018.

TECHNICAL FIELD

The subject invention includes a method and system that uses at least one sensor to determine an amount of movement of an infrastructure component in relation to a learned reference point, and subsequently corrects current object position to compensate for movement of the infrastructure component.

BACKGROUND

Environmental sensor systems provide data to autonomous vehicles such that the vehicles can follow lanes, avoid collisions, re-route around traffic, etc. These systems can also communicate data to driver-operated vehicles to provide updates regarding weather, traffic, road conditions, emergency warnings, etc. The sensor systems include various types of sensors that are mounted to infrastructure (traffic lights, signs, parking meters, etc.) near intersections, along roads, and on buildings. The sensor systems are used to recognize lane and crosswalk boundaries, and can also be used to determine distances between vehicles and/or other objects that are stationary or moving in or along the road.

This data is compiled and broadcasted such that the information can be communicated to various entities. One example of a communication system is referred to as "vehicle-to-everything (V2X)" communication, and includes the passing of information from a vehicle to any entity that may affect the vehicle, and vice versa. It is a vehicular communication system that incorporates other more specific types of communication such as V2I (vehicle-to-infrastructure), V2N (vehicle-to-network), V2V (vehicle-to-vehicle), V2P (vehicle-to-pedestrian), V2D (vehicle-to-device), and V2G (vehicle-to-grid). This type of communication improves road safety and traffic efficiency, as well as providing energy savings. Thus, it is important that the sensors provide accurate data.

SUMMARY

In one exemplary embodiment, a method and apparatus includes at least one environmental sensor mounted to an infrastructure component that is capable of moving relative to ground. The at least one environmental sensor determines an object position. A system uses environmental data collected over time to learn a fixed environment that includes at least one learned reference point. The system determines an amount of movement of the infrastructure component in relation to the learned reference point. The system corrects object position to compensate for movement of the infrastructure component.

In another embodiment according to the previous embodiment, the at least one environmental sensor tracks stationary detected objects over time to learn the fixed environment.

In another embodiment according to any of the previous embodiments, the infrastructure component comprises a pole, sign, or building structure.

In another embodiment according to any of the previous embodiments, the learned reference point comprises a learned stationary object position of a stationary object, and wherein the system identifies that the infrastructure component is moving by determining that a current position of the stationary object has varied from the learned stationary object position.

In another embodiment according to any of the previous embodiments, the fixed environment comprises an intersection with at least one traffic light system and the learned stationary object position is for a crosswalk, vehicle lane, or parking space.

In another embodiment according to any of the previous embodiments, the at least one traffic light system includes at least one pole that supports at least one traffic light and a traffic light system controller configured to control operation of the at least one traffic light, and wherein the at least one environmental sensor is mounted on the pole.

In another embodiment according to any of the previous embodiments, the at least one pole comprises a main pole that is held fixed to ground and supports one or more secondary poles or traffic arms that support the at least one traffic light and the at least one environmental sensor.

In another embodiment according to any of the previous embodiments, movement of the one or more secondary poles or traffic arms relative to ground is initiated by a wind force.

In another embodiment according to any of the previous embodiments, movement of the infrastructure component relative to ground is initiated by an external force exerted on the infrastructure component.

In another embodiment according to any of the previous embodiments, the external force comprises a wind force.

In another embodiment according to any of the previous embodiments, the at least one environmental sensor comprises a motion sensor, an optical camera sensor, a radar sensor, a lidar sensor, a laser sensor and/or an ultrasonic sensor.

In another embodiment according to any of the previous embodiments, the at least one environmental sensor generates object position data for moving and/or stationary objects and communicates the object position data to a system controller that analyzes the data to determine current positions for the moving and/or stationary objects, and wherein the system controller, in response to detected movement of the infrastructure component, determines the amount of movement of the infrastructure component in relation to the learned reference point and corrects current positions for the moving and/or stationary objects to compensate for movement of the infrastructure component.

In another embodiment according to any of the previous embodiments, the fixed environment comprises an intersection, the infrastructure component comprises at least one traffic light system, and the learned reference point is for at least one of a crosswalk, vehicle lane, or parking space.

In another exemplary embodiment, a method includes mounting at least one environmental sensor mounted to an infrastructure component that is capable of moving relative to ground, using the at least one environmental sensor to determine an object position, collecting environmental data from the at least one environmental sensor over time to learn a fixed environment that includes at least one learned reference point, determining an amount of movement of the infrastructure component in relation to the learned reference point, and correcting the object position to compensate for movement of the infrastructure component.

In another embodiment according to any of the previous embodiments, the method includes using the at least one environmental sensor to generate object position data for moving and/or stationary objects and communicating the object position data to a system controller that analyzes the data to determine current positions for the moving and/or stationary objects, and wherein the system controller, in response to detected movement of the infrastructure component, determines the amount of movement of the infrastructure component in relation to the learned reference point and corrects current positions for the moving and/or stationary objects to compensate for movement of the infrastructure component.

In another embodiment according to any of the previous embodiments, the fixed environment comprises an intersection, the infrastructure component comprises at least one traffic light system, and the learned reference point is for at least one of a crosswalk, vehicle lane, or parking space.

In another embodiment according to any of the previous embodiments, the at least one traffic light system includes at least one pole that supports at least one traffic light, and wherein the at least one environmental sensor is mounted on the at least one pole.

In another embodiment according to any of the previous embodiments, the method includes using the at least one environmental sensor to track stationary detected objects over time to learn the fixed environment, and wherein the learned reference point comprises a learned stationary object position of a stationary object, and including identifying that the infrastructure component is moving by determining that a current position of the stationary object has varied from the learned stationary object position.

In another embodiment according to any of the previous embodiments, movement of the infrastructure component relative to ground is initiated by an external force exerted on the infrastructure component.

In another embodiment according to any of the previous embodiments, the at least one environmental sensor comprises a motion sensor, an optical camera sensor, a radar sensor, a lidar sensor, a laser sensor and/or an ultrasonic sensor.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION OF AN EMBODIMENT

The subject invention provides an apparatus that includes at least one environmental sensor mounted to an infrastructure component that is capable of moving relative to ground. The at least one environmental sensor is used to determine an object position. A system uses environmental data collected over time to learn a fixed environment that includes at least one learned reference point. The system determines an amount of movement of the infrastructure component in relation to the learned reference point and corrects object position to compensate for movement of the infrastructure component.

In one example, the environmental sensor tracks stationary detected objects over time to learn the fixed environment. In one example, the infrastructure component comprises a pole, sign, building, or other structure that is capable of moving relative to ground. In one example, the learned reference point comprises a learned stationary object position of a stationary object. The system identifies that the infrastructure component is moving by determining that a current position of the stationary object has varied from the learned stationary object position. In one example, the fixed environment comprises an intersection with at least one traffic light and the learned stationary object position is for a crosswalk, vehicle lane, or parking space, for example.

Figure 1:
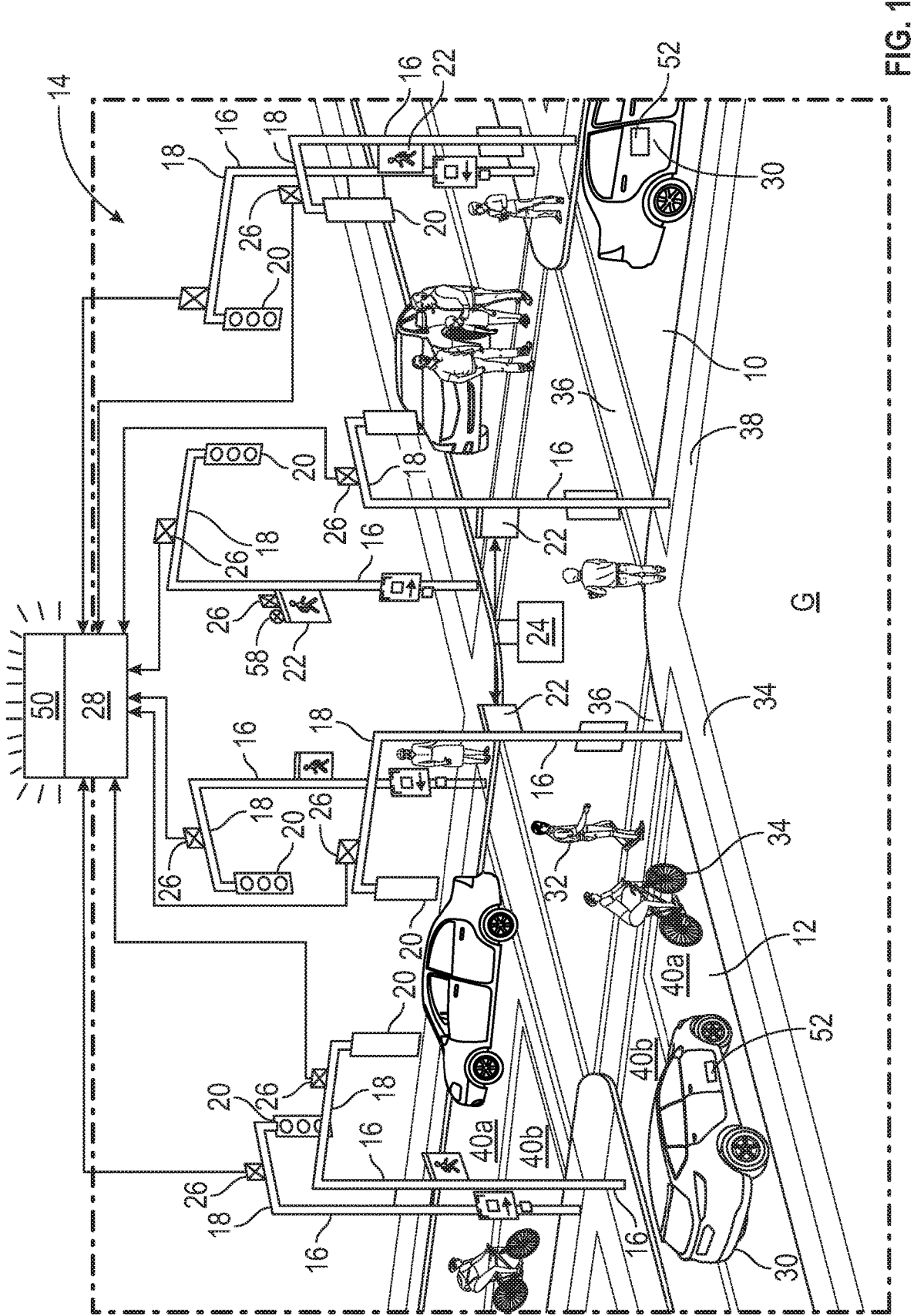
FIG. 1 is a perspective view of an intersection incorporating a system according to the invention.

FIG. 1 shows an intersection of a first road 10 with a second road 12. A traffic light system 14 is positioned at one or more corners between the first 10 and second 12 roads. In one example, the traffic light system 14 includes one or more main poles 16 that are held fixed relative to ground G. In one example, the main poles 16 extend upwardly from the ground G and support one or more secondary poles or traffic arms 18. Each traffic arm 18 includes one or more traffic lights 20. The main pole 16 may also include additional traffic lights or signs 22. A traffic light controller 24 controls operation of the traffic lights 20 such that vehicles can move efficiently through the intersection without colliding with each other.

Figure 2:
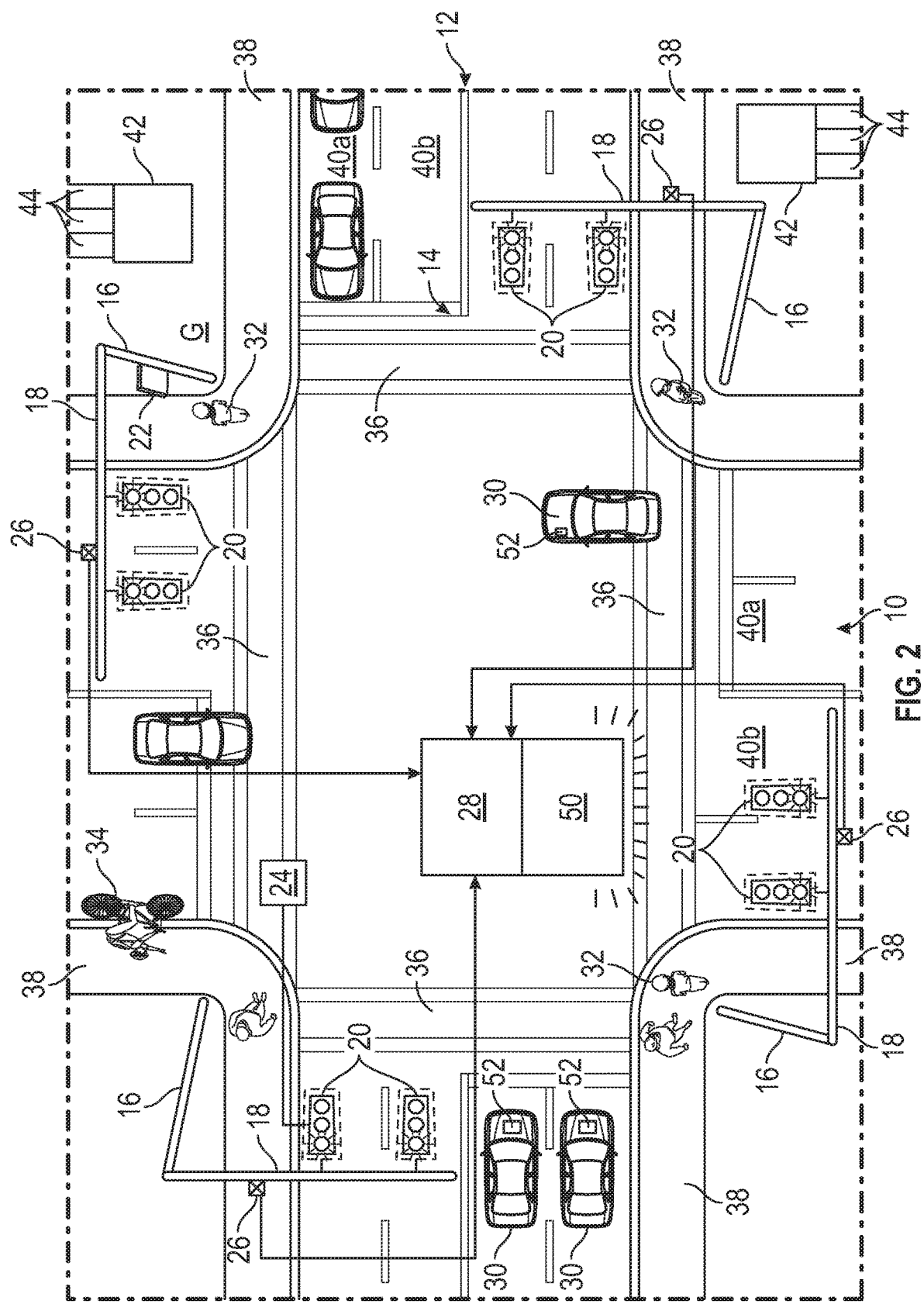
FIG. 2 is an overhead view of an intersection incorporating a system according to the invention.

Ambient or environmental sensors 26 are mounted to infrastructure, such as the pole 16 or arms 18. A control system 28 uses data generated by the sensors 26 to track moving objects (vehicles 30, pedestrians 32, bikers 34, etc.) and to detect stationary objects, such as a location of a crosswalk 36, sidewalk 38, and/or a lane 40a, 40b for example, over time to learn a fixed environment. Thus, in addition to tracking and determining positions of moving objects, the sensors 26 are used to identify the location of fixed structures such as lanes 40a/40b, crosswalks 36, sidewalks 38, etc., as well as buildings 42, and parking spaces 44 (FIG. 2), such that moving objects (pedestrians 32, bikers 34, vehicles 30, etc.) can have a frame of reference. In one example, the control system 28 uses ambient/environmental sensors 26 that comprise one or more of the following: motion sensor, optical camera sensor, radar sensor, lidar sensor, laser sensor and/or ultrasonic sensor. The ambient sensors 26 capture fixed object locations as well as location and movement information from pedestrians 32 and vehicles 30 in relation to other vehicles 30, pedestrians 32, or infrastructure, e.g. traffic light system 14, building 42, etc., such that this information can be broadcast over a communication system 50 such as vehicle-to-X, for example.

The communication system 50 wirelessly communicates via the vehicle-to-X communication systems to exchange information with surrounding vehicles 30 or infrastructure devices. The vehicle-to-X messages sent by the vehicles 30 usually comprise at least an absolute position, an absolute speed, and a piece of information about the direction of travel of the vehicle 30. The vehicles 30 can include vehicle control systems 52 that communicate the vehicle data to the control system 28. The vehicle control systems 52 can also include GPS and communication systems. The vehicle-to-X messages sent/generated by the control system 28 usually comprise moving object location, lane location, crosswalk location, parking space locations, etc. For the vehicle-to-X communication system to send and/or receive messages and/or information, the system can use one or more of the following connection classes: WLAN connection, e.g. based on IEEE 802.11, ISM (Industrial, Scientific, Medical Band) connection, Bluetooth® connection, ZigBee connection, UWB (ultrawide band) connection, WiMax® (Worldwide Interoperability for Microwave Access) connection, LTE-V2X, Dedicated Short Range Communications (DSRC), infrared connection, mobile radio connection, and/or radar-based communication.

It is important that the data from the environmental sensors 26 be accurate, especially when autonomous vehicles are relying on the data. However, in some circumstances, the data from the sensors 26 can be adversely affected or compromised by movement of the pole 16 and/or traffic arms 18. For example, high winds can cause the pole 16 and arms 18 to wave, bend, and/or oscillate in multiple directions. To account for this movement, the control system 28 uses environmental data that is collected and compiled over time to learn a fixed environment that includes at least one learned reference point. The learned reference point can comprise a position of a fixed/stationary object, such as the crosswalk 36 or sidewalk 38 for example. The control system 28 determines an amount of movement of the infrastructure component, e.g. traffic pole 16, traffic arm 18, etc., in relation to the learned reference point and subsequently corrects any current moving object positions during the movement to compensate for movement of the infrastructure component to provide better overall accuracy.

Thus, the control system 28 uses the prior learned environment to account for any inconsistencies in detected object position that may be caused by movement of the pole 16 or arms 18. The subject invention provides for long term learning and tracking of stationary detected objects to learn the fixed environment, and then uses these learned reference points to correct moving object positions for improved sensor accuracy.

The control system 28 can be a separate system or can be incorporated as part of the traffic light control system 24 for the traffic lights 20. The control system 28 can include one or more controllers comprising a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The controller can be a custom made or commercially available processor, a central processing unit (CPU), an auxiliary processor among several processors associated with the computing device, a semiconductor based microprocessor (in the form of a microchip or chip set), or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

The controller can be configured to execute software stored within the memory, to communicate data to and from the memory, and to generally control operations of the computing device pursuant to the software. Software in memory, in whole or in part, is read by the processor, perhaps buffered within the processor, and then executed.

As discussed above, the environmental sensors 26 generate object position data for moving and/or stationary objects and communicates the object position data to the control system 28. The control system 28 then analyzes the object position data to determine current positions for the moving and/or stationary objects. Further, the control system 28, in response to detected movement of the infrastructure component, determines the amount of movement of the infrastructure component in relation to the learned reference point and corrects current positions for the moving and/or stationary objects to compensate for movement of the infrastructure component.

Thus, the control system 28 uses the prior learned environment to account for any object position inconsistencies that may be caused by movement of the infrastructure component, e.g. pole 16, arms 18, etc. The control system 28 increases overall accuracy by determining an amount of movement of the infrastructure component in relation to learned reference points and subsequently corrects any moving object positions to compensate for movement of the infrastructure component. The benefit of this system 28 is that separate acceleration sensors are not required to detect and measure the movement of the infrastructure component so overall cost is reduced.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. An apparatus comprising:
a sensor mounted to an infrastructure component, wherein the sensor is configured to detect a stationary object and a moving object; and
a processor configured to determine a location of the stationary object as a reference point, determine an object position of the moving object detected by the sensor, determine an amount of movement of the sensor in relation to the reference point, and determine a corrected object position of the moving object based on the object position and the amount of movement of the sensor.

2. The apparatus according to claim 1, wherein the sensor tracks the stationary object over time to determine the location of the stationary object.

3. The apparatus according to claim 2, wherein the infrastructure component comprises a pole, sign, or building structure.

4. The apparatus according to claim 3, wherein the reference point comprises a learned stationary object position of the stationary object, and
wherein the processor is configured to identify that the infrastructure component is moving by determining that a current position of the stationary object has varied from the learned stationary object position.

5. The apparatus according to claim 4, wherein the stationary object comprises a crosswalk, vehicle lane, or parking space.

6. The apparatus according to claim 1, wherein the sensor comprises a motion sensor, an optical camera sensor, a radar sensor, a lidar sensor, a laser sensor and/or an ultrasonic sensor.

7. A method of an infrastructure system determining a position of a moving object, the method comprising:
determining a location of a stationary object detected by a sensor as a reference point;
determining an object position of the moving object detected by the sensor;
determining an amount of movement of the sensor in relation to the reference point; and
determining a corrected object position of the moving object based on the object position and the amount of movement of the sensor.

8. The method according to claim 7, wherein the stationary object comprises at least one of a crosswalk, vehicle lane, or parking space.

9. The method according to claim 7, wherein the sensor comprises a motion sensor, an optical camera sensor, a radar sensor, a lidar sensor, a laser sensor and/or an ultrasonic sensor.

* * * * *